June 13, 1967
T. EKLUND
3,325,160
VACUUM-ENCLOSED TILTABLE FURNACE
Filed Feb. 24, 1964
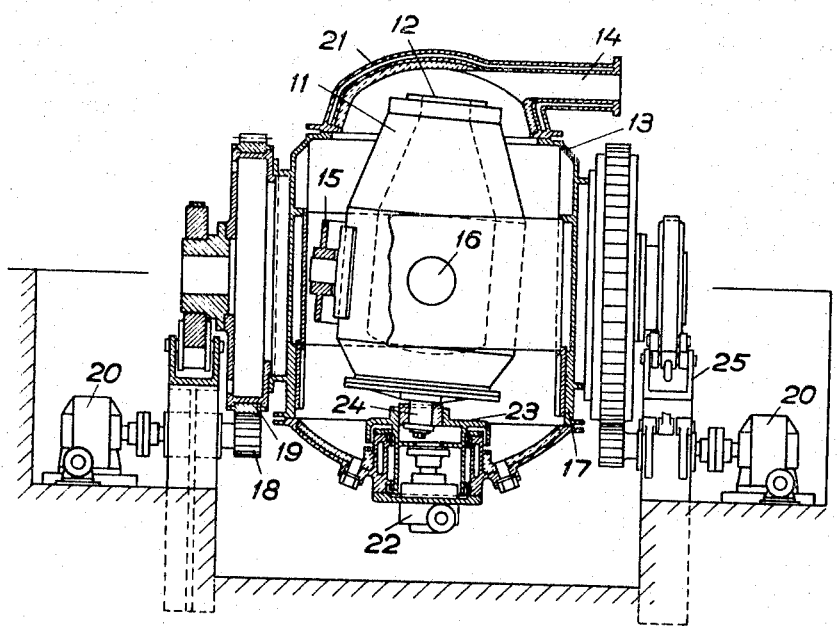
INVENTOR.
TORSTEN EKLUND
BY Bailey, Stephens &
Huettig 3,325,160
VACUUM-ENCLOSED TILTABLE FURNACE
Torsten Eklund, Surahammar, Sweden, assignor to Allmanna Svenska Elektriska Aktiebolaget, Vasteras, Sweden, a corporation of Sweden
Filed Feb. 24, 1964, Ser. No. 346,872
Claims priority, application Sweden, Mar. 6, 1963, 2,432/63
6 Claims. (Cl. 266—34)

The present invention relates to a furnace for manufacturing and/or treatment of metals and metal alloys such as steel.

United States application S.N. 284,451, filed May 31, 1963 relates to a rotatable furnace for the manufacture and/or treatment of steel or other metal or metal alloy. Steel manufacture by means of refining of pig iron often occurs in rotatable furnaces, for example with the known so-called Kaldo process, described for example in Murex Ltd. Review 2:21, 1960, pp. 1–38, or Iron and Steel Engr., February 1960, pp. 65–75. Said application describes an arrangement for combining a furnace for steel manufacture according to the above with degassing during stirring. In this arrangement a vacuum tight tank was placed around the rotatable furnace, provided with at least one gas evacuating conduit. This arrangement makes possible high quality of the complete product and simultaneously steel manufacture etc., and degassing in the same space without intermediate transfer of the melt.

The present invention relates to a modification of the above mentioned arrangement. In the above literature reference steel manufacture or treatment according to the L.D.-process is also mentioned. This process consists in blowing oxygen into a melt (steel, iron, metal-alloy) which is present in a converter, by means of a water cooled lance, placed above the melt. The invention is based on an arrangement in which steel, metal, metal alloy manufacture and treatment are carried out in a converter, which is tiltable. The invention is characterised, like that of the application previously identified, in that a vacuum tight tank is arranged around the furnace and is provided with at least one gas evacuating conduit. By means of this arrangement it is possible to obtain in the same container (converter) steel manufacture etc., as well as degassing during stirring, i.e. a permanent surface exchange. In addition by means of the tiltability a suitable surface form for degassing is obtained and the same part of the converter is never in constant contact with the surface of the melt with the risk that this part is "eaten up." The melt surface at its periphery during the tilting will be permanently agitated up and down along the lining. In a preferred embodiment of the invention the furnace spout is directed substantially upwards and the furnace is cardanically suspended, and a point on its lower part is arranged to be capable of being set in circular or elliptical movement by means of a motor. Such a tilting movement is easy to effect and is also advantageous from a metallurgical point of view.

The invention is more fully exemplified in accompanying figure, which shows a cardanically suspended furnace according to the invention.

An L.D.-converter 11 is cardanically suspended, i.e. movable around two mutually perpendicular horizontal axes. The spout 12 is intended to be directed upwards except at tapping, relining, etc. The furnace (converter 11) is in the usual way provided with acid or basic brick lining and is enclosed by a vacuum tight wall 13, provided with at least one gas evacuating conduit 14 and with an outlet for the L.D.-process water cooled oxygen lance (not shown). The cardanic suspension is constituted by a bearing ring rotatably journalled at 16 on the wall 13, and in this bearing ring the converter 11 is pivoted. The wall 13 is part of a tiltable frame 17, tiltable by means of gearing 18, 19 and driving means 20 for producing tilting. During tilting of the stand, for example during tapping of the melt or during relining, etc., the upper part 21 of the wall is removed, which part because of the radiation from the furnace, etc., should be water-cooled.

In the bottom part of the wall a special tilting motor 22 is arranged which drives a disc 23, a crank-shaft or the like for rotation of a tap 24 in the converter bottom in a circular or elliptical track during tilting movements of the furnace.

The assembly may suitably be loosely laid in a fixed cradle 25, and can be locked to this by suitable locking means with a view to locking the stand with the converter in a suitable position during tapping, etc.

The number of evacuating conduits may of course be more than one, and possibly this conduit (these conduits) may be provided with closing means (valve means).

The arrangement according to the invention is used in the following way:

The converter 11 is positioned with the spout 12 upwards and the stand 17 is locked in this position.

Molten pig iron is refined under atmospheric pressure by means of oxygen blowing into the melt into steel. During the refining process the motor 22 is rotated and the converter receives a tilting movement of such a kind that its longitudinal axis is moved along a double-conical surface. Thereafter the chamber inside the vacuum tight wall 13 is evacuated to a pressure below 100 torr, suitably under 50 torr by means of one or several pumps not shown, whereafter the converter is tilted, but with lower tilting speed than during the refining. The combination of tilting and vacuum means that a permanent new melt surface is subjected to vacuum treatment which results in high quality for the complete steel melt. The belt is thus relieved of for example $H_2$, CO and $N_2$.

After completed degassing the lid 21 is removed and the stand tilts, so that the melt is tapped into a ladle, in moulds or the like.

It is important that the surface for the melt is permanently agitated along the furnace walls, which is also attained by the invention. The melt obtains a convex surface from directed upwards during the tilting movement, which is an advantage from the point of view of wearing as well as degassing.

The method of producing tilting movement for the furnace may of course be varied in a variety of ways; likewise also the build up of the vacuum tight wall around the converter can vary. It is possible also to complete the arrangement with an electro-magnetic stirrer lying outside or near the converter.

I claim:

1. Furnace for manufacturing of metals and metal alloys such as steel, said furnace comprising a vacuum tight tank, a container, means mounting said container within said vacuum tight tank for movement about two perpendicular axes, said tank having at least one gas evacuation conduit, and means connected with the bottom of the container for producing movement of the container axis along a closed path in a plane substantially parallel to the plane of said axes.

2. Furnace as claimed in claim 1, a base, a frame movably mounted on said base to turn about a substantially horizontal axis, said tank being carried by said frame.

3. Furnace as claimed in claim 1, said container having a spout, said container mounting means mounting the container normally with its spout directed substantially upwards.

4. Furnace as claimed in claim 1, said movement producing means comprising a motor outside the tank.

5. Furnace as claimed in claim 2, said frame forming a portion of the tank wall.

6. Furnace as claimed in claim 1, said gas evacuation conduit ending at the tank wall close to the spout.

References Cited

UNITED STATES PATENTS

| | | | |
|---|---|---|---|
| 2,875,036 | 2/1959 | Kalling | 266—34 X |
| 2,976,090 | 3/1961 | McFeathers | 266—36 X |
| 3,146,503 | 9/1964 | Sickbert | 266—34 X |

JOHN F. CAMPBELL, *Primary Examiner.*

J. M. ROMANCHIK, *Assistant Examiner.*